United States Patent [19]

Dufes

[11] 3,721,383
[45] March 20, 1973

[54] PACKAGING ASSEMBLY OF HEAT-SEALABLE FILM MATERIAL

[75] Inventor: Bernard Dufes, Chilly-Mazarin, France

[73] Assignee: Altec-Sopitec S.A., Ivry Sur Seine (Val de Marne), France

[22] Filed: Feb. 18, 1971

[21] Appl. No.: 116,341

[30] Foreign Application Priority Data

March 3, 1970 France.................................7007489

[52] U.S. Cl......................................229/63, 150/11
[51] Int. Cl. .............................................B65d 33/28
[58] Field of Search........229/63, DIG. 3; 150/11, 1.7

[56] References Cited

UNITED STATES PATENTS 3,506,048    4/1970   Jortikka..............................150/11 X
3,093,295    6/1963   Kugler.................................229/63

FOREIGN PATENTS OR APPLICATIONS 450,136    4/1968   Switzerland..........................229/63

Primary Examiner—Joseph R. Leclair
Assistant Examiner—Stephen P. Garbe
Attorney—Young & Thompson

[57]    ABSTRACT

A packaging assembly of heat sealable plastics film material comprises an envelope with a closed end and an open end. The closed end is encircled by two lengths of ribbon formed from a film of similar heat sealable material. The two ribbons are contained in a guiding passage around the packaging assembly and are accessible through openings formed in the guiding passage.

8 Claims, 12 Drawing Figures

INVENTOR
BERNARD DUFES

INVENTOR
BERNARD DUFES
BY Young & Thompson
ATTYS.

3,721,383

PACKAGING ASSEMBLY OF HEAT-SEALABLE FILM MATERIAL

BACKGROUND OF THE INVENTION

The present invention relates to a packaging assembly of plastics material, particularly for products requiring hygienic conditions.

With the particular object of protecting and facilitating transport and handling of products of the kind in question it has already been proposed to insert these into an envelope adapted to fit the shape of the product, with an open end capable of being sealed and equipped with closure means. The closure means generally used are draw strings which when retightened enable the bag to be reclosed after some of its contents have been removed.

Bags of this kind are difficult to manufacture continuously, particularly in respect of the automatic positioning of the strings, which have to be enclosed in a guide passage. These difficulties naturally effect the price of the packagings.

Apart from this major disadvantage, the usual packagings do not facilitate good presentation for selling purposes, since their display necessitates display stands specially adapted for this purpose.

The present invention has the aim of obviating these disadvantages and for this purpose a packaging of heat-sealable plastics material which is simple and economic to produce and which has an attractive appearance.

SUMMARY

A packaging according to the invention, made of heat-sealable plastics film, is of the type comprising an envelope adapted to match the shape of a filling, with one end open for the introduction of the latter and with the opposite end closed, one of said ends being encircled by a closing string, and is characterized in that the closing string is constituted by two lengths of ribbon cut from a film of heat-sealable material similar to the film of the envelope, said lengths of ribbon being contained in guide passages or hems encircling the closed bottom and made accessible through notches previously cut out for this purpose in said hems.

This arrangement offers the advantage of readily lending itself to automatic production line manufacture and of providing products which are satisfactory in appearance and very convenient to use.

According to another arrangement of the invention, the packaging is formed by the cutting and heat sealing of a strip of film folded over, a reserve of end material is provided in the folding zone of the strip between two heat sealing lines forming the ribbon guide hems.

This arrangement makes it possible to take advantage of two separate parameters, namely on the one hand the amount and on the other hand the arrangement of the reserve of end material, to obtain optimum adaptation of the closed end to the shape and consistency of the filling which it is required to cover.

DESCRIPTION OF THE PREFERRED EMBODIMENTS

In the various Figures the same references are used to designate identical or equivalent elements.

Figure 1:
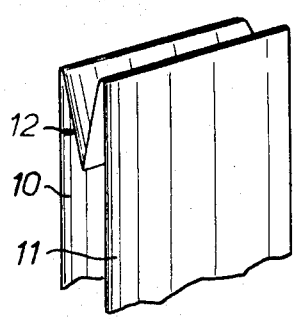
FIGS. 1 to 6 illustrate in perspective, successive phases of production of a packaging according to the invention.
Figure 2:
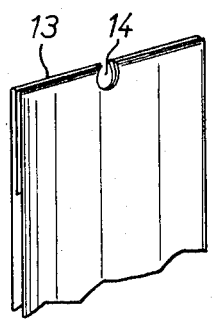
Figure 3:
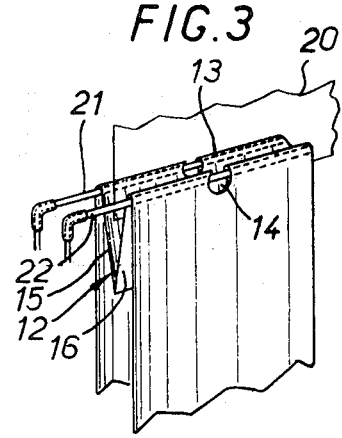
Figure 4:
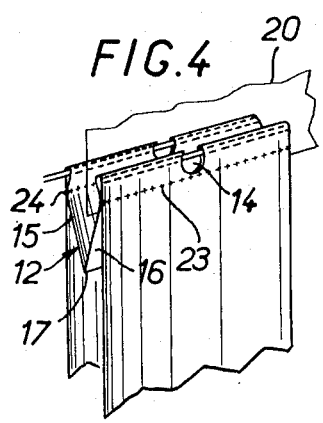
Figure 5:
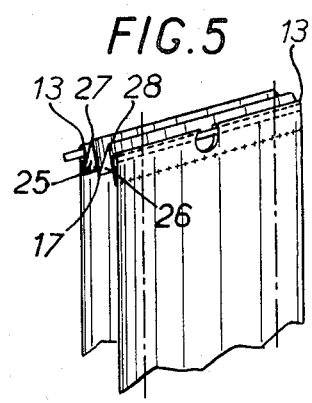
Figure 6:
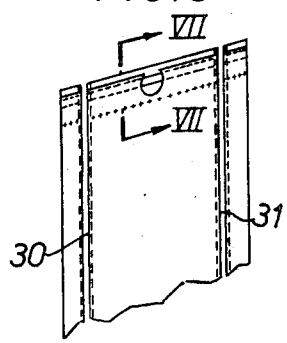

In the embodiment illustrated in FIGS. 1 to 9, the starting material (FIG. 1) is a strip of heat-sealable plastics film folded over on each side of a gusset 12, to form two panels 10, 11, one of which is preferably wider than the other. Only a short length of the strip is shown in FIG. 1. In the four thicknesses of the double folded edge 13 (FIG. 2) notches 14 are cut from place to place at predetermined intervals, depending on the width of the packaging to be produced. These notches, which are punched out, have here a circular shape and extend over an arc of more than 180°; they have their outlet on the edge of the fold along a chord C (see FIG. 7) of a length shorter than the diameter D.

In the next operation (FIG. 3) the two flaps 15, 16 of the gusset 12 are separated again by passing on each side of a blade-shaped tool indicated at 20, and in addition the panels 10, 11 are moved apart. Into each of the passages opened in this manner between the flaps 15, 16 respectively and the adjacent panels 10, 11 there is introduced a ribbon 21, 22 of film cut from a sheet of plastics material similar to that used to make the envelope itself.

A hem is then formed around each of the ribbons placed in position in this manner (FIG. 4), by closing an edge of their respective passages by means of two longitudinal welding lines or seams 23, 24 spaced a certain distance away from the notches 14. The portion of the gusset 12 remaining between the two welding lines, on each side of the central edge 17, constitutes a reserve of end material.

This reserve of end material is subjected to further folding (FIG. 5) thus forming two outside panels 25 and a pair of inside panels 26 with fold edges 27, 28 extending above the fold edge 13 by a certain projecting height $h$ (see also FIG. 7), while the central fold edge 17 is at substantially the same level as the welding lines 23, 24.

The strip prepared in this manner then passes (FIG. 6) to a cutting and welding station (not shown), in which it is simultaneously cut and welded transversely, as indicated at 30, 31 in the middle of the distances between two successive notches 14. The ribbons or straps 21, 22 are naturally cut at the same time; they may also be welded at the same time or be welded in an additional operation.

Figure 8:
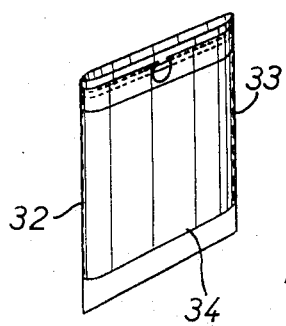
FIG. 8 shows the completed packaging.

FIG. 8 illustrates the completed packaging with two side edges 32, 33 formed by the cutting and welding of the sheet forming the envelope and with an open end 34 opposite the closed end which is constituted by the reserve of end material described above. This packaging is suitable for filling through the open end, this filling being facilitated by the projection of one of the panels beyond the other; closing by heat sealing is left to the care of the user.

Figure 9:
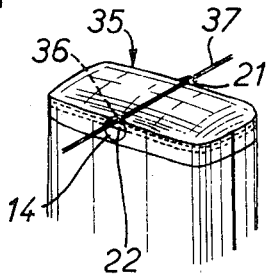
FIG. 9 shows part of the packaging with its contents.

FIG. 9 shows the appearance of a packaging produced by the process described and filled with cotton wool, for example. The packaging as described provides perfectly satisfactory wrapping for a filling of this kind, which is characterized by rounding of all its edges and the curved shape which results therefrom for the end portion which is covered by the closed end formed by the reserve of material and surrounded by the closure ribbons. In order to provide a good appearance for the packaging it is desirable that these ribbons should be relatively tight around the filling, which entails a certain bulging of its curved end portion, so that the portion of the filling which is encircled by the ribbons has a length of perimeter substantially equal to that of a standard section of said filling. It is moreover convenient for the tension of the ribbon to be sufficiently moderate for it to remain possible for a finger or the rod of a display stand to be passed through the notches 14.

The arrangement described for the reserve of material forming the closed end of the packaging enables the packaging to be adapted to be filled with a wide range of different fillings. It allows suitable selection of the fullness of the reserve of end material formed by the residual gusset left between the welding lines 23, 24 as well as the arrangement of this reserve of end material prior to the cutting and welding of the side edges, this arrangement being determined by the position of the central edge 17 and the projection height $h$ (which could be either negative or positive).

While the thickness of the filling naturally constitutes the factor determining the fullness of the reserve material, the arrangement of the latter will be dependent on the shape and consistency of the filling, so as to effect the wrapping of the latter together with optimum holding by the closure ribbons.

The notches are generally given dimensions which are simply sufficient to permit the passing of a finger through them. It will then also be easy for a series of packagings to be hooked or threaded on a display stand, which may be composed of a simple rod, as indicated at 37 in FIG. 9.

Access to the filling makes it necessary for the user to break the packaging at any suitable point; this will generally be a weakened or cut line provided for this purpose in the middle of the end enclosed by the closing ribbons, that is to say along or near the central fold edge 17.

Figure 7:
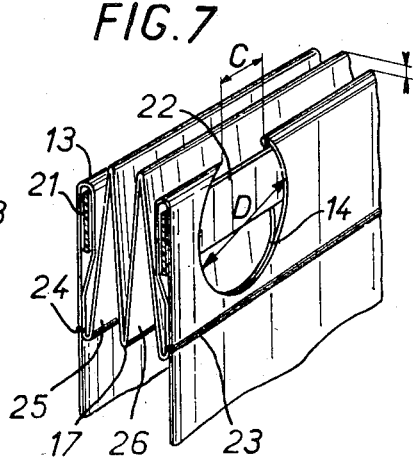
FIG. 7 is a view in perspective, and partly in section along the line VII—VII in FIG. 6.
Figure 10:
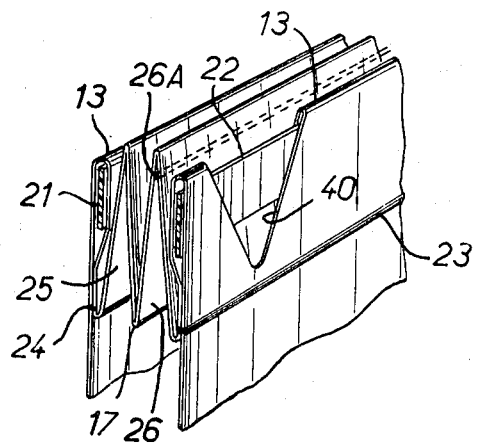
FIGS. 10 to 12 are partial views in perspective of alternative embodiments.

The variant illustrated in FIG. 10, which in general is similar to FIG. 7, is distinguished from the preceding embodiment by the V-shaped contour of its notch 40; the latter widens progressively towards its outlet on the fold edge 13. This form of notch may be preferred in certain cases, because of the greater ease of gripping the ribbons or straps which it offers.

Provision has furthermore been made in this example for the incorporation in the fold of the gusset 26 of, for example, an easy opening means constituted by a thread 26a; by pulling this thread towards the outside it is easily possible to make a clean cut along the fold edge of the corresponding gusset. In order to facilitate gripping the thread, elements projecting to a lesser or greater extent may be provided at suitable intervals along this thread.

Figure 11:
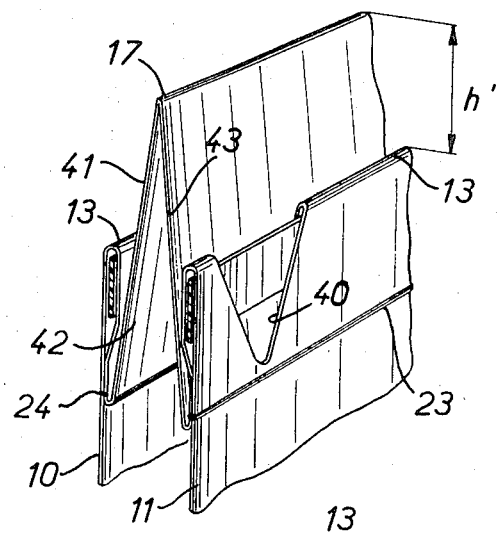

The variant illustrated in FIG. 11 shows a limit case as regards the provision of a large reserve of end material. This reserve has here been left in the form of a single gusset 41 formed in the outward direction by two flaps 42, 43 on each side of the central edge 17, which is thus taken to a maximum height $h'$ of projection beyond the fold edge 13. This is a limit case the use of which would appear not to have to be contemplated except with fillings of a very special kind.

Figure 12:
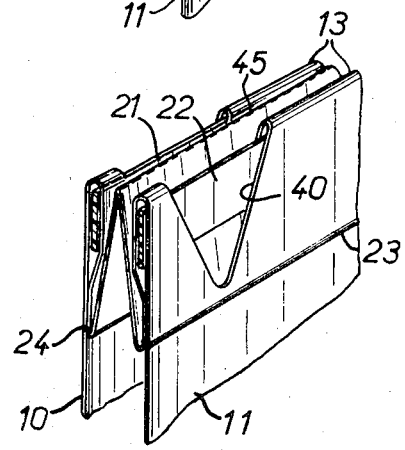

The variant of FIG. 12 illustrates the case of a reserve of end material reduced to a pair of external panels 25 ending in a simple fold edge 45, the latter being situated level with the edges 13 or even being below that level.

A construction of this kind is suitable for the packaging of flat objects, discs, plates, brochures, cards, panels, etc. A case or outer packaging for a case designed in this manner may constitute a means of storage by hooking the closing ribbons on display stand rods, this possibility being useful for the purpose of displaying for sale and also for the user of the objects.

The embodiments described above were given solely by way of illustration and obviously are capable of various other modifications without departing from the scope of the invention.

Instead of being placed in the middle of the packaging, the notches could be situated in any position, even near or astride the side edges.

In another variant, more than one notch may be provided at the top of the same envelope; for example, two notches close together to permit the passage of two fingers etc., if desired.

I claim:

1. A packaging assembly of heat-sealable film material comprising an envelope corresponding in shape to the intended filling, the envelope having an open end for filling the envelope and a closed end opposite the open end, and two seams at the closed end defining two guide passages for receiving two lengths of ribbon of heat-sealable film material, the guide passages having apertures for enabling access to the lengths of ribbon, the closed end including an expansible panel extending between the seams and outwardly thereof when the packaging assembly is empty so that the packaging assembly can be filled completely at least up to the seams.

2. A packaging assembly according to claim 1, wherein the expansible end panel includes at least one fold line disposed outwardly of the seams when the packaging assembly is empty.

3. A packaging assembly according to claim 1, wherein the expansible end panel includes at least one fold line disposed outwardly of the outermost portions of the guide passages when the packaging assembly is empty.

4. A packaging assembly according to claim 1, wherein the expansible end panel comprises one gusset centered about a central fold.

5. A packaging assembly according to claim 1, wherein the expansible end panel comprises two gussets centered about a central fold.

6. A packaging assembly according to claim 5, wherein the central fold is disposed substantially at the same level as the seams.

7. A packaging assembly according to claim 1, wherein the expansible end panel is adapted to expand to a length greater than the width of the intended filling.

8. A packaging assembly according to claim 1, wherein the seams are weld lines.

* * * * *